United States Patent [19]

Suzuki et al.

[11] Patent Number: 5,514,772
[45] Date of Patent: May 7, 1996

[54] METHOD FOR PRODUCING POWDERY AND GRANULAR POLYMERS

[75] Inventors: Fumio Suzuki; Haruki Sato; Masaki Sugihara; Wataru Hadano, all of Otake, Japan

[73] Assignee: Mitsubishi Rayon Co., Ltd., Tokyo, Japan

[21] Appl. No.: 197,282

[22] Filed: Feb. 16, 1994

[30] Foreign Application Priority Data

| Feb. 16, 1993 | [JP] | Japan | 5-026913 |
| Mar. 4, 1993 | [JP] | Japan | 5-044090 |
| Mar. 9, 1993 | [JP] | Japan | 5-048061 |

[51] Int. Cl.⁶ .............................. C08L 33/12; C08F 6/22
[52] U.S. Cl. .................. 528/487; 528/486; 523/352; 524/156; 524/161
[58] Field of Search ................ 523/352; 528/486, 528/487; 524/156, 161

[56] References Cited

U.S. PATENT DOCUMENTS

| 2,467,054 | 4/1949 | Rumbold | 524/161 |
| 2,482,048 | 9/1949 | Williams . | |
| 3,079,360 | 2/1963 | Sutherland, Jr. et al. | 523/352 |
| 3,607,983 | 9/1971 | Rushton et al. | 524/161 |
| 4,374,941 | 2/1983 | Sandstrom | 523/352 |
| 4,897,462 | 1/1990 | Yusa et al. | 523/352 |

FOREIGN PATENT DOCUMENTS

| 0101576 | 2/1984 | European Pat. Off. | 528/487 |
| 2157297 | 10/1985 | United Kingdom . | |

OTHER PUBLICATIONS

Database WPI, Derwent Publications Ltd., vol. 8, No. 199 (C–242), AN–82–200 359, JP–A–59 091 103, May 25, 1984.
Database WPI, Derwent Publications Ltd., AN 94–012303 [02], JP–A–5 320 221, Dec. 3, 1993.

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

A method for producing a powdery and granular polymer by two coagulation steps comprising coagulating a latex of the polymer, the latex containing a sulfuric acid ester series and/or sulfonic acid series anionic surface active agents, with an acid to an amount of the polymer of 40 to 80 wt. % at a first coagulation step, and then bringing coagulation to completion with an acid or salt at a second coagulation step. According to the present invention, a powdery and granular polymer having a sharp particle size distribution and a high bulk specific gravity can be obtained.

10 Claims, 1 Drawing Sheet

FIG. 1

METHOD FOR PRODUCING POWDERY AND GRANULAR POLYMERS

BACKGROUND OF THE INVENTION

1. Field of the Invention

The present invention relates to a method for producing a powdery and granular polymer having a sharp particle size distribution and a high bulk specific gravity.

2. Description of the Related Art

Hitherto, various investigations have been made on a method for improving the powder characteristics of a powdery and granular polymer obtained in recovering the polymer from a polymer latex. For example, U.S. Pat. No. 4,897,462 discloses a method of coagulating a graft copolymer latex containing many elastic backbone polymers at the particular concentration of a coagulating agent. Also, a method of adding a coagulating agent in two or more steps, and a method of adding a hard resin, inorganic compound, etc. for modification to the resulting coagulated particle are disclosed in Japanese Patent Application Kokai No. 59-91103 and U.S. Pat. No. 4,275,178.

In the method of coagulating at the particular concentration of a coagulating agent, there is a case where the coagulation does not occur at all depending upon the kind and amount of a surface active agent present in the latex, or a case where a powdery and granular polymer having improved powder characteristics is not obtained even if the coagulation is carried out so that the uncoagulated latex remains in only few amounts. Therefore, an acid or salt is added in large amounts in order to bring the coagulation to completion. This method, however, has a defect that it exerts adverse effects on the thermal stability of the powder as an article, and therefore that in order to solve the adverse effects, the coagulated slurry needs to be neutralized with an alkaline substance before solidification, which makes the coagulation process complicated.

The method of adding a coagulating agent in two or more steps has a defect that, when this method is used to coagulate the latex containing only a surface active agent unstable to acids, it locally brings the coagulation to completion even if the amount of the coagulated polymer and pH are controlled, because of which a good powdery and granular polymer is not obtained. Further, when the temperature is raised too high in a second coagulation vessel and vessels subsequent thereto, the coagulated particles are undesirably likely to aggregate.

Also, the method of modifying the surface of the coagulated particle by adding a hard resin or inorganic compound in order to raise the bulk specific gravity of the resulting powdery and granular polymer, intends to make dense the packing structure of the particle group, thereby raising the bulk specific gravity, and not to raise the particle density of the coagulated particle itself. This method, therefore, has a defect that a sufficiently high bulk specific gravity is not obtained.

SUMMARY OF THE INVENTION

The present inventors have made an extensive study in order to solve the above problems, and as a result have found that a powdery and granular polymer having a sharp particle size distribution, a high bulk specific gravity and excellent thermal stability can be provided by carrying out the coagulation of a latex of a polymer in such a manner that: The latex containing a sulfuric acid ester series and/or sulfonic acid series anionic surface active agents is coagulated to a particular amount of the polymer at a first coagulation step, the emulsified state-maintaining action of the surface active agent stable to an acid and the emulsified state-breaking action of the acid are controlled, an additional coagulating agent is added at a second coagulation step to bring the coagulation to completion under particular conditions, and then the resulting coagulated slurry is heat-treated in a particular temperature range for a particular period of time. The present inventors thus attained to the present invention.

According to the method of the present invention, the powdery and granular polymer containing few fine powders and having a sharp particle size distribution and a high bulk specific gravity can be easily obtained by controlling the amount of the polymer aggregated by the first coagulation of the latex of the polymer, the latex containing a particular amount of the surface active agent, and subjecting the aggregated polymer to a particular heat treatment.

PREFERRED EMBODIMENTS OF THE INVENTION

The polymer used in the present invention includes homopolymers, copolymers and graft copolymers. The homopolymers and copolymers include those obtained from monomers such as aromatic vinyl compounds (e.g. dichlorostyrene, α-methylstyrene), alkyl methacrylates (e.g. methyl methacrylate, ethyl methacrylate, butyl methacrylate), vinyl cyanide compounds (e.g. acrylonitrile, methacrylonitrile), alkyl acrylates (e.g. methyl acrylate, ethyl acrylate, butyl acrylate), vinyl compounds (e.g. acrylic acid, vinyl chloride, vinylidene chloride, vinyl acetate), conjugated diolefins (e.g. butadiene, chloroprene, isoprene) and their substituted products, ethylene glycol, etc., and mixtures of these homopolymers and copolymers.

The graft copolymers are those obtained by grafting monomers capable of forming hard polymers or their mixture onto elastic backbone polymers. The graft polymerization method may be any of those usually used. Initiators, other polymerization assistants, etc. are not critical and hence commonly used ones sufficiently meet the purpose.

The elastic backbone polymers constituting the graft copolymers include diene polymers (e.g. polybutadiene, polyisoprene, polychloroprene), polymers of a $C_4$–$C_{10}$ alkyl acrylate (e.g. polybutyl acrylate, polyoctyl acrylate), dimethylsiloxane polymers and copolymers of these polymers with monomers copolymerizable therewith. The copolymerizable monomer includes aromatic vinyl compounds (e.g. styrene, α-methylstyrene), alkyl methacrylates (e.g. methyl methacrylate, ethylmethacrylate, $C_1$–$C_3$ alkyl acrylates (e.g. methyl acrylate, ethyl acrylate), vinyl cyanide compounds (e.g. acrylonitrile, methacrylonitrile) and the like.

The monomers capable of forming hard polymers include aromatic vinyl compounds (e.g. styrene, α-methylstyrene), alkyl methacrylates (e.g. methyl methacrylate, ethyl methacrylate, butyl methacrylate), vinyl cyanide compounds (e.g. acrylonitrile, methacrylonitrile), vinyl halides (e.g. vinyl chloride, vinyl bromide) and the like. These monomers are used alone or in mixture of two or more of them.

In practicing the present invention, it is necessary to cause a sulfuric acid ester series and/or sulfonic acid series anionic surface active agents to exist in the latex of the above polymer. The sulfuric acid ester series anionic surface active agent includes, for example, the salt of higher alcohol sulfuric acid esters, the salt of polyoxyethylene alkyl sulfuric acid esters, and the like. The sulfonic acid series anionic surface active agent includes, for example, the salt of alkylsulfonic acid, the salt of alkylbenzenesulfonic acid, the salt of alkylsulfosuccinic acid, the salt of alkyldiphenylethersulfonic acid, and the like. The above surface active agents may be added at any stage before, during and after polymerization.

The amount of the above surface active agent is preferably 0.05 to 0.5 part by weight in total, more preferably 0.05 to 0.15 part by weight in total based on 100 parts by weight of the polymer. In the latex containing no surface active agent described above, the emulsified state-maintaining action of the surface active agent is weak relative to the emulsified state-breaking action of the acid. Because of this, the coagulation is sporadically completed in the latex, a state where the particles are aggregated in the latex becomes difficult to control stably, and finally the desired powdery and granular polymer having a sharp particle size distribution cannot be obtained. On the other hand, increasing the amount of the surface active agent undesirably makes too strong the emulsified state-maintaining action of the agent, so that the coagulation becomes difficult to occur without a large amount of the acid. Concerning the thermal stability of the resulting powdery product, it is desirable to add the surface active agent in such a degree of amount that the coagulation can occur stably.

The coagulating agent used at the first step of the present invention includes, for example, inorganic acids (e.g. hydrochloric acid, sulfuric acid, phosphoric acid) and organic acids (e.g. formic acid, acetic acid). In the first coagulation step, 40 to 80 wt. % of the polymer in the latex needs to be coagulated. Here, the amount of the aggregated polymer was calculated from the amount of the unaggregated polymer obtained by filtering the coagulated slurry through Toyo Filter Paper No. 131 (the third kind described in JIS P3801) and measuring the concentration of the polymer of the filtrate. When the amount of the aggregated polymer is less than 40 wt. %, a great portion of the latex of the polymer is coagulated in a state where the emulsified state-breaking action is strong at the time of completion of the second coagulation. As a result, it undesirably becomes difficult to obtain the powdery and granular polymer having a sharp particle size distribution. On the other hand, when the amount of the aggregated polymer exceeds 80 wt. %, the emulsified state-breaking action is too strong, so that it is difficult to obtain the powdery and granular polymer having a sharp particle size distribution. The acid used for the first coagulation is preferably added to the latex of the polymer in such an amount that pH at the time of coagulation satisfies the following equation:

$$pH \leq \frac{0.2}{X} + 2.0$$

where X represents parts by weight of the sulfuric acid ester series and/or sulfonic acid series anionic surface active agents based on 100 parts by weight of the polymer. When the value of pH exceeds that of the right side, the emulsified state-maintaining action of the surface active agent becomes too strong relative to the emulsified state-breaking action of the acid. As a result, undesirably the coagulation does not occur at all or a long period of time is required for the coagulation.

The coagulating agent used for the second coagulation includes the above acids used for the first coagulation, inorganic salts (e.g. aluminum sulfate, magnesium sulfate, sodium chloride, calcium chloride, sodium sulfate, magnesium chloride) and organic salts (e.g. sodium acetate, calcium acetate). These agents are used alone or in mixture thereof.

The pH of the slurry after completion of the second coagulation is preferably 2.0 or more in terms of the thermal stability of the resulting powdery product. When the pH of the coagulated slurry is less than 2.0, it is desirable to adjust the pH to 2 to 4 with an alkali (e.g. sodium hydroxide).

Solidification operation by heat treatment is applied to the aggregated particles in the coagulated slurry, the liquid is removed from the slurry, and then the aggregated particles are recovered. This particle is recovered as the powdery and granular polymer through the steps of washing with water, dehydration and drying. Since the aggregated particles obtained by the second coagulation has a structure in which fine particles have been aggregated, they are porous as compared with the aggregated particles obtained by the method in which the coagulation is carried out in one step with a large amount of the coagulating agent, so that they hold much water in its inside. Therefore, in order to recover the aggregated particles in the form of a powdery product having a high bulk specific gravity, it is necessary to cause the aggregated particles to take the structure of closest packing of the fine particles, thereby increasing the density of the aggregated particles.

For reducing the water content of the aggregated particles after dehydration, thereby recovering the particle in the form of a powdery and granular product having a high bulk specific gravity, it is effective to treat the aggregated particles at a high solidification temperature for a long time to promote the melt-adhesion between the fine particles. That is, it is desirable to heat-treat the homopolymers, copolymers and graft copolymers having a $T_g$ higher than 25° C. for 30 minutes or more in the temperature range of 90° C. to 120° C. Under the strong heat-treatment condition like this, melt-adhesion between the fine particles is promoted to increase the particle density and enhance a power to maintain a particulate form. Polymers which are desirable for a method of strengthening solidification to raise the bulk specific gravity include polymers obtained from monomers containing at least 60 wt. % of one or more members selected from the group consisting of methyl methacrylate, butyl methacrylate, styrene and α-methylstyrene. The other component is not critical, and it may be a monomer capable of forming soft polymers such as copolymerizable, ethylenic, unsaturated monomers and the like. As to graft copolymers containing 60 wt. % or more of the elastic backbone polymer having a low $T_g$, the melt-adhesion proceeds, but the fine particles are difficult to form the closest packing, which results in a reduction of the bulk specific gravity. Also, when the solidification is carried out at less than 90° C. or the solidification time is less than 30 minutes, the melt-adhesion between the fine particles is not sufficient, so that the density of the aggregated particles does not rise sufficiently.

As to graft copolymers containing 60 wt. % or more of the elastic backbone polymer, the particle having a high particle density can be obtained by heat-treating the coagulated slurry at 75° C. or less to carry out dehydration and drying. The reason may be considered as follows: After heat treatment, the fine particles constituting the aggregated particles do not yet melt-adhere to one another, and therefore water contained in the aggregated particles is released at the time of drying to cause shrinkage of the particles themselves, as a result of which the fine particles form the closest packing to increase the particle density, thereby making it possible to obtain the powdery and granular polymer having a high bulk specific gravity. Polymers which are desirable for such a procedure that a solidification treatment is carried out at a low temperature to increase the bulk specific gravity include the graft copolymer which is obtained by emulsion-polymerizing a monomer capable of forming hard polymers onto the above elastic backbone polymer and of which the elastic backbone polymer content is 60 wt. % or more, preferably 70 wt. % or more. When this content is less than 60 wt. %, melt-adhesion between the fine particles constituting the coagulated particle becomes insufficient and as a result, undesirably, fine powders are likely to be produced at the steps of dehydration and drying.

As to graft copolymers containing 60 wt. % or more of the elastic backbone polymer, it is desirable to add a hard non-elastic polymer or inorganic compound to the slurry after coagulation in an amount of 0.01 to 10 parts by weight based on 100 parts by weight of the graft copolymer, thereby modifying the surface of the coagulated particle so that dried powders, obtained from the slurry by dehydration and drying, does not aggregate. When the amount added is less than 0.01 part by weight, there is no effect to modify the powdery product. When it exceeds 10 parts by weight, the graft copolymer itself lowers in its physical properties such as impact resistance, transparency and the like. The addition may be carried out at any step after coagulation, for example, just after coagulation, after solidification or after drying.

The hard, non-elastic polymer for powder modification used in the present invention is produced from a monomer or monomer mixture containing at least 80 wt. % of one or more monomers having a $T_g$ higher than 25° C. and being preferably selected from the group consisting of methyl methacrylate, ethyl methacrylate, propyl methacrylate, butyl methacrylate, styrene and α-methylstyrene. The balance of the monomer mixture may be any other copolymerizable, ethylenic, unsaturated monomer. There are given, for example, monomers capable of forming soft polymers such as $C_1-C_4$ alkyl acrylates.

The inorganic compound for powder modification includes the oxides, chlorides, hydroxides, carbonates and sulfates of one or more elements selected from the group consisting of Si, Mg, Al, Ca, Ba, Zn and Ti. These compounds can be used alone or in a mixture thereof. Specific examples of the compound include, for example, $SiO_2$, $MgO$, $Mg(OH)_2$, $MgCO_3$, $Al_2O_3$, $Al(OH)_3$, $Al_2(CO_3)_3$, $CaO$, $CaCO_3$, $TiO_2$, talc, clay, diatomaceous earth, calcium metasilicate and the like. It is desirable for these inorganic compounds to have a solubility in water at 25° C. of 0.5 g/100 ml or less at 25° C.

Figure 1:
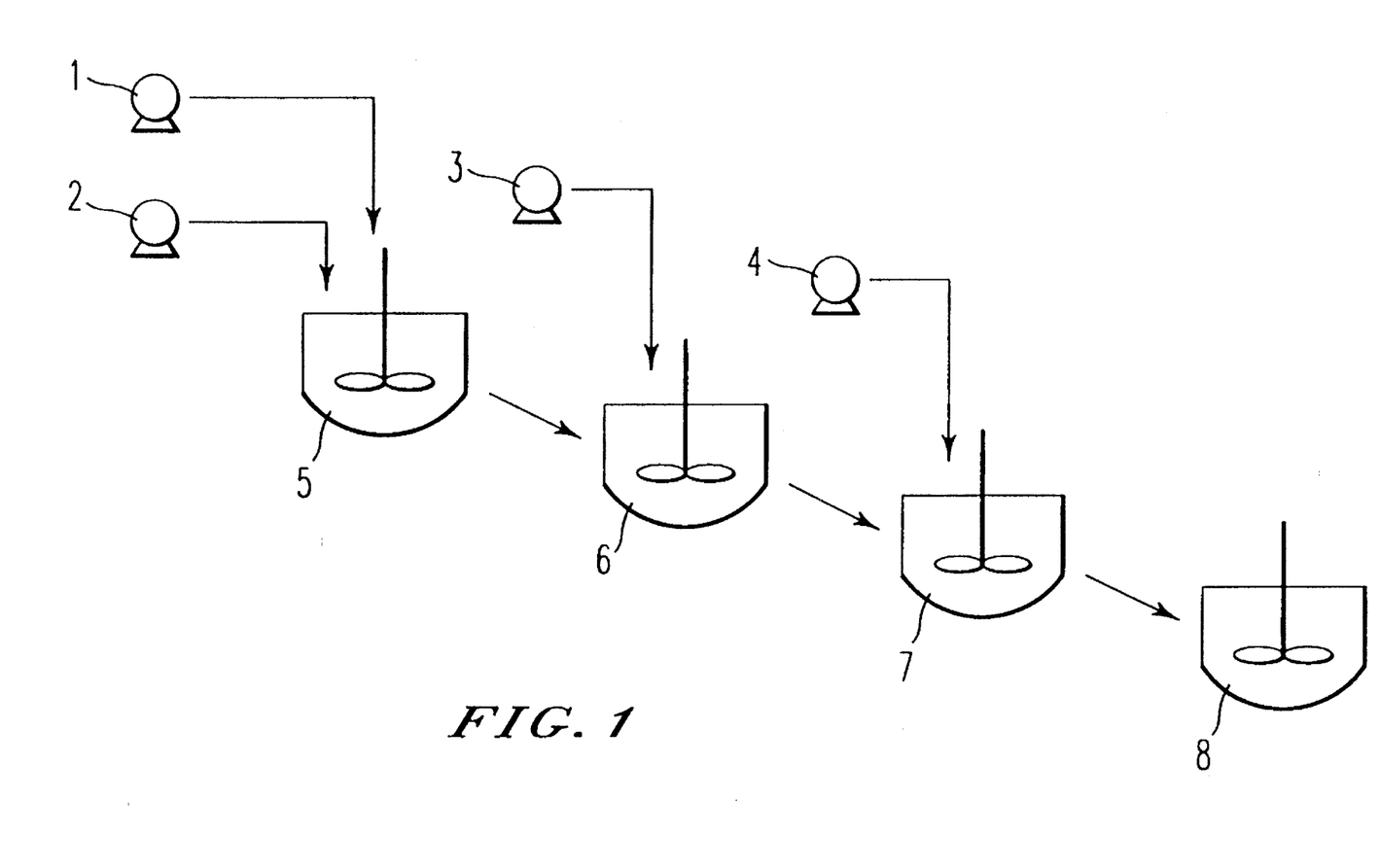
FIG. 1 shows the diagram of a typical apparatus used in the practice of the present invention.

The present invention will be illustrated with reference to a typical apparatus used in the practice of the present invention (FIG. 1). The polymer latex and an acid are supplied from the fixed displacement pumps (1) and (2), respectively, to the first vessel (5). An additional acid is optionally supplied from the fixed displacement pump (3) to the second vessel (6) in order to enhance the percent recovery of the polymer. To the third vessel (7) is supplied an alkali, a pH regulating agent for the slurry, from the fixed displacement pump (4). The slurry is heat-treated in the fourth vessel (8), after which it is washed with water, dehydrated and dried, not shown in the figure, to obtain the desired powdery and granular polymer.

The present invention will be explained in more detail with reference to the following examples, but it is not to be interpreted as being limited to these examples. Examples were carried out using the apparatus shown in FIG. 1.

EXAMPLE 1

A latex of a copolymer (solid content, 28%) was obtained by emulsion-polymerizing 85% of methyl methacrylate with 15% of butyl acrylate. The polymer particle in the resulting latex had an average particle size of 0.105 μm and a pH of 8.0. The kind and amount of the surface active agent present in the latex are as shown in Table 1.

The above latex and the acid shown in Table 1 were supplied to the first vessel for first coagulation so that pH and the amount (%) of the aggregated polymer in the first vessel took values shown in Table 1. The acid and alkali shown in Table 1 were supplied to the second vessel for second coagulation and the third vessel for neutralization of the liquid in the slurry, respectively, so that pHs took values shown in Table 1. In the fourth vessel, the coagulated slurry was solidified under heat-treatment conditions shown in Table 1. The slurry discharged from the fourth vessel was freed of the liquid to recover the aggregated particles, which was then washed with water, dehydrated and dried to obtain the powdery and granular polymer.

The physical properties of the resulting powdery and granular polymer were measured by the following methods. The measurement methods used here were common to all of the examples and comparative examples described below. The results of evaluation are shown in Table 1.

Symmetry degree of particle: The symmetry degree N of particle was indicated by the following equation, $$N=D_{75}/D_{25}$$

wherein $D_{75}$ represents a particle size (μm) at 75% of an integrating weight distribution curve, and $D_{25}$ represents a particle size (μm) at 25% of the integrating weight distribution curve of the particle group.

Bulk specific gravity: Measured according to JIS K-6721.

Thermal stability: The dried powder was put in a gear oven kept at a constant temperature of 120° C., and the change of colored state by heat was visually assessed with the lapse of time. The colored state was graded in the following three steps:
  o Hardly colored.
  Δ Colored yellow.
  × Scorched brown.

EXAMPLES 2 AND 3

The powdery and granular polymer was obtained in the same manner as in Example 1 except that pH and the amount (%) of the aggregated polymer in the first vessel and pHs in the second and third vessels were changed as shown in Table 1. The results shown in Table 1.

EXAMPLE 4

The powdery and granular polymer was obtained in the same manner as in Example 1 except that the amount of the surface active agent present in the latex and pHs in the first and second vessels were changed as shown in Table 1, and also that pH in the third vessel was changed as shown in Table 1 without adding an alkali to the third vessel. The results are shown in Table 1.

EXAMPLE 5

The powdery and granular polymer was obtained in the same manner as in Example 1 except that the amount of the surface active agent present in the latex, pH and the amount (%) of the aggregated polymer in the first vessel and pHs in the second and third vessels were changed as shown in Table 1. The results are shown in Table 1.

EXAMPLE 6

The powdery and granular polymer was obtained in the same manner as in Example 1 except that the kind and amount of the surface active agent present in the latex, pH and the amount (%) of the aggregated polymer in the first vessel and pHs in the second and third vessels were changed as shown in Table 1. The results are shown in Table 1.

TABLE 1

|  | Example | | | | | |
| --- | --- | --- | --- | --- | --- | --- |
|  | 1 | 2 | 3 | 4 | 5 | 6 |
| Sulfuric acid ester series and/or sulfonic acid series anionic surface active agents | | | | | | |
| Kind | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate | Sodium lauryl sulfate |
| Amount per 100 parts by weight of polymer (part by weight) | 0.2 | 0.2 | 0.2 | 0.05 | 0.1 | 0.1 |
| Other surface active agents | | | | | | |
| Kind | Potassium alkenylsuccinate | Potassium alkenylsuccinate | Potassium alkenylsuccinate | Potassium alkenylsuccinate | Potassium alkenylsuccinate | Potassium alkenylsuccinate |
| Amount per 100 parts by weight of polymer (part by weight) | 1.0 | 1.0 | 1.0 | 1.0 | 1.0 | 1.0 |
| First vessel | | | | | | |
| Kind of acid | Sulfuric acid | Sulfuric acid | Sulfuric acid | Sulfuric acid | Sulfuric acid | Sulfuric acid |
| pH | 1.8 | 1.6 | 1.5 | 2.9 | 2.7 | 2.7 |
| Temperature (°C.) | 65 | 65 | 65 | 65 | 65 | 65 |
| Amount of aggregated polymer (%) | 52 | 64 | 76 | 52 | 64 | 69 |
| Second vessel | | | | | | |
| Kind of acid | Sulfuric acid | Sulfuric acid | Sulfuric acid | Sulfuric acid | Sulfuric acid | Sulfuric acid |
| pH | 1.3 | 1.2 | 1.1 | 2.2 | 2.1 | 2.1 |
| Temperature (°C.) | 65 | 65 | 65 | 65 | 65 | 65 |
| Third vessel | | | | | | |
| Kind of alkali | NaOH | NaOH | NaOH | — | — | — |
| pH | 3.0 | 1.6 | 1.5 | 2.2 | 2.1 | 2.1 |
| Temperature (°C.) | 65 | 65 | 65 | 65 | 65 | 65 |
| Fourth vessel | | | | | | |
| Temperature (°C.) | 95 | 95 | 95 | 95 | 95 | 95 |
| Time (min) | 60 | 60 | 60 | 60 | 60 | 60 |
| Particle size distribution (%) | | | | | | |
| 840 μm or more | 6.0 | 2.5 | 2.9 | 6.0 | 2.5 | 0.6 |
| 840–500 μm | 6.4 | 2.7 | 4.0 | 6.4 | 2.7 | 2.6 |
| 500–210 μm | 41.0 | 25.6 | 26.2 | 41.0 | 25.6 | 26.1 |
| 210–105 μm | 37.5 | 57.0 | 49.9 | 37.5 | 57.0 | 53.9 |
| 105–37 μm | 8.7 | 11.7 | 16.4 | 8.7 | 11.7 | 16.6 |
| 37 μm or less | 0.4 | 0.5 | 0.6 | 0.4 | 0.5 | 0.2 |
| Symmetry degree of particle | 2.1 | 1.9 | 2.2 | 2.1 | 1.9 | 1.9 |
| Bulk specific gravity (g/ml) | 0.40 | 0.39 | 0.39 | 0.40 | 0.40 | 0.39 |
| Thermal stability | ○ | ○ | ○ | ○ | ○ | ○ |

EXAMPLES 7 TO 10

The powdery and granular polymer was obtained in the same manner as in Example 5 except that heat-treatment conditions in the fourth vessel was changed as shown in Table 2. The results are shown in Table 2.

TABLE 2

| | Example | | | |
|---|---|---|---|---|
| | 7 | 8 | 9 | 10 |
| Sulfuric acid ester series and/or sulfonic anionic surface active agents | | | | |
| Kind | Sodium polyoxy-ethylene alkyl ether sulfate | Sodium polyoxy-ethylene alkyl ether sulfate | Sodium polyoxy-ethylene alkyl ether sulfate | Sodium polyoxy-ethylene alkyl ether sulfate |
| Amount per 100 parts by weight of polymer (part by weight) | 0.1 | 0.1 | 0.1 | 0.1 |
| Other surface active agents | | | | |
| Kind | Potassium alkenylsuccinate | Potassium alkenylsuccinate | Potassium alkenylsuccinate | Potassium alkenylsuccinate |
| Amount per 100 parts by weight of polymer (part by weight) | 1.0 | 1.0 | 1.0 | 1.0 |
| First vessel | | | | |
| Kind of acid | Sulfuric acid | Sulfuric acid | Sulfuric acid | Sulfuric acid |
| pH | 2.7 | 2.7 | 2.7 | 2.7 |
| Temperature (°C.) | 65 | 65 | 65 | 65 |
| Amount of aggregated polymer (%) | 64 | 64 | 64 | 64 |
| Second vessel | | | | |
| Kind of acid | Sulfuric acid | Sulfuric acid | Sulfuric acid | Sulfuric acid |
| pH | 2.1 | 2.1 | 2.1 | 2.1 |
| Temperature (°C.) | 65 | 65 | 65 | 65 |
| Third vessel | | | | |
| Kind of alkali | — | — | — | — |
| pH | 2.1 | 2.1 | 2.1 | 2.1 |
| Temperature (°C.) | 65 | 65 | 65 | 65 |
| Fourth vessel | | | | |
| Temperature (°C.) | 95 | 95 | 90 | 98 |
| Time (min) | 40 | 120 | 60 | 60 |
| Particle size distribution (%) | | | | |
| 840 μm or more | 2.5 | 2.4 | 2.5 | 2.6 |
| 840–500 μm | 2.7 | 2.8 | 2.7 | 2.6 |
| 500–210 μm | 25.6 | 25.5 | 25.7 | 25.5 |
| 210–105 μm | 57.0 | 57.1 | 56.9 | 57.1 |
| 105–37 μm | 11.7 | 11.7 | 11.7 | 11.7 |
| 37 μm or less | 0.5 | 0.5 | 0.5 | 0.5 |
| Symmetry degree of particle | 1.9 | 1.9 | 2.2 | 2.1 |
| Bulk specific gravity (g/ml) | 0.39 | 0.40 | 0.37 | 0.41 |
| Thermal stability | ○ | ○ | ○ | ○ |

EXAMPLES 11 TO 13

The powdery and granular polymer was obtained in the same manner as in Example 5 except that heat-treatment conditions in the fourth vessel was changed as shown in Table 3. The results are shown in Table 3.

EXAMPLE 14

The powdery and granular polymer was obtained in the same manner as in Example 1 except that the amount of the surface active agent present in the latex, pH and the amount (%) of the aggregated polymer in the first vessel and pHs in the second and third vessels were changed as shown in Table 3. The results are shown in Table 3.

Comparative Example 1

The powdery and granular polymer was obtained in the same manner as in Example 1 except that pH and the amount (%) of the aggregated polymer in the first vessel were changed as shown in Table 3. The results are shown in Table 3.

Comparative Example 2

The powdery and granular polymer was obtained in the same manner as in Example 1 except that pH and the amount (%) of the aggregated polymer in the first vessel and pHs in the second and third vessels were changed as shown in Table 3. The results are shown in Table 3.

Comparative Example 3

The powdery and granular polymer was obtained in the same manner as in Example 1 except that the sulfuric acid ester series and sulfonic acid series anionic surface active agents were not used, pH and the amount (%) of the aggregated polymer in the first vessel and pH in the second vessel were changed as shown in Table 3, and also that pH in the third vessel was changed as shown in Table 3 without adding an alkali to the third vessel. The results are shown in Table 3.

TABLE 3

|  | Example | | | | Comparative Example | | |
| --- | --- | --- | --- | --- | --- | --- | --- |
|  | 11 | 12 | 13 | 14 | 1 | 2 | 3 |
| Sulfuric acid ester series and/or sulfonic acid series anionic surface active agents | | | | | | | |
| Kind | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate | Sodium polyoxyethylene alkyl ether sulfate |
| Amount per 100 parts by weight of polymer (part by weight) | 0.1 | 0.1 | 0.1 | 0.3 | 0.2 | 0.2 | 0 |
| Other surface active agents | | | | | | | |
| Kind | Potassium alkenylsuccinate | Potassium alkenylsuccinate | Potassium alkenylsuccinate | Potassium alkenylsuccinate | Potassium alkenylsuccinate | Potassium alkenylsuccinate | Potassium alkenylsuccinate |
| Amount per 100 parts by weight of polymer (part by weight) | 1.0 | 1.0 | 1.0 | 1.0 | 1.0 | 1.0 | 1.0 |
| First vessel | | | | | | | |
| Kind of acid | Sulfuric acid | Sulfuric acid | Sulfuric acid | Sulfuric acid | Sulfuric acid | Sulfuric acid | Sulfuric acid |
| pH | 2.7 | 2.7 | 2.7 | 1.6 | 1.9 | 1.4 | 4.4 |
| Temperature (°C.) | 65 | 65 | 65 | 65 | 65 | 65 | 65 |
| Amount of aggregated polymer (%) | 64 | 64 | 64 | 61 | 35 | 91 | 57 |
| Second vessel | | | | | | | |
| Kind of acid | Sulfuric acid | Sulfuric acid | Sulfuric acid | Sulfuric acid | Sulfuric acid | Sulfuric acid | Sulfuric acid |
| pH | 2.1 | 2.1 | 2.1 | 1.3 | 1.3 | 1.0 | 2.5 |
| Temperature (°C.) | 65 | 65 | 65 | 65 | 65 | 65 | 65 |
| Third vessel | | | | | | | |
| Kind of alkali | — | — | — | — | — | — | — |
| pH | 2.1 | 2.1 | 2.1 | 1.3 | 3.0 | 1.4 | 2.5 |
| Temperature (°C.) | 65 | 65 | 65 | 65 | 65 | 65 | 65 |
| Fourth vessel | | | | | | | |
| Temperature (°C.) | 95 | 95 | 85 | 95 | 95 | 95 | 95 |
| Time (min) | 5 | 20 | 60 | 5 | 60 | 60 | 60 |
| Particle size distribution (%) | | | | | | | |
| 840 μm or more | 2.4 | 2.5 | 2.4 | 2.9 | 9.0 | 23.8 | 2.7 |
| 840–500 μm | 2.8 | 2.6 | 2.9 | 4.0 | 8.0 | 14.0 | 21.2 |
| 500–210 μm | 25.6 | 25.7 | 25.5 | 26.2 | 32.5 | 23.5 | 29.7 |
| 210–105 μm | 57.0 | 57.1 | 57.0 | 49.9 | 29.3 | 24.4 | 29.8 |
| 105–37 μm | 11.8 | 11.6 | 11.8 | 16.4 | 18.9 | 14.0 | 16.3 |
| 37 μm or less | 0.4 | 0.5 | 0.4 | 0.6 | 2.3 | 0.3 | 0.3 |
| Symmetry degree of particle | 1.9 | 1.9 | 1.9 | 2.2 | 3.4 | 5.6 | 4.0 |
| Bulk specific gravity (g/ml) | 0.31 | 0.34 | 0.34 | 0.31 | — | — | — |
| Thermal stability | o | o | o | x | o | o | o |

EXAMPLE 15

A latex of a graft copolymer (solid content, 36 wt. %) was obtained by graft-polymerizing 15 parts by weight of styrene, 13.2 parts by weight of methyl methacrylate and 1.8 parts by weight of ethyl acrylate onto 70 parts by weight of a styrene/butadiene elastic backbone polymer. The polymer particle in the resulting latex (pH 8.0) had an average particle size of 0.1 μm. The kind and amount of the surface active agent present in the latex are as shown in Table 1.

The above latex and the acid shown in Table 4 were supplied to the first vessel so that pH and the amount (%) of the aggregated polymer in the vessel took values shown in Table 4. The acid shown in Table 4 was supplied to the second vessel so that pH in the vessel took a value shown in Table 4. Further, the alkali shown in Table 4 was supplied to the third vessel so that pH in the vessel took a value shown in Table 4. The temperature in each vessel was controlled so as to take a value shown in Table 4. The slurry discharged from the fourth vessel was washed with water, dehydrated and dried, and then it was dry-blended with 0.5 wt. % of hydrophobic silica (article number, R972 produced by Nippon Aerosil Co.; average particle size, 0.014 μm) to obtain the powdery and granular polymer. The results are shown in Table 4.

EXAMPLES 16 AND 17

The powdery and granular polymer was obtained in the same manner as in Example 15 except that the kind of the surface active agent present in the latex and amount of the aggregated polymer in the first vessel were changed as shown in Table 4. The results are shown in Table 4.

EXAMPLE 18

The powdery and granular polymer was obtained in the same manner as in Example 15 except that the amount of the surface active agent present in the latex, pH and the amount (%) of the aggregated polymer in the first vessel and pH in the second vessel were changed as shown in Table 4, and also that pH in the third vessel was changed as shown in Table 4 without adding an alkali to the third vessel. The results of evaluation are shown in Table 4.

EXAMPLE 19

The powdery and granular polymer was obtained in the same manner as in Example 15 except that the kind and amount of the surface active agent present in the latex, pH and the amount (%) of the aggregated polymer in the first vessel and pH in the second vessel were changed as shown in Table 4, and also that pH in the third vessel was changed as shown in Table 4 without adding an alkali to the third vessel. The results are shown in Table 4.

TABLE 4

| | Example | | | | |
|---|---|---|---|---|---|
| | 15 | 16 | 17 | 18 | 19 |
| Sulfuric acid ester series and/or sulfonic anionic surface active agents | | | | | |
| Kind | Sodium lauryl sulfate | Sodium dioctylsulfosuccinate | Sodium dodecylbenzenesulfonate | Sodium lauryl sulfate | Sodium polyoxyethylene alkyl ether sulfate |
| Amount per 100 parts by weight of polymer (part by weight) | 0.2 | 0.2 | 0.2 | 0.08 | 0.1 |
| Other surface active agents | | | | | |
| Kind | Potassium oleate | Potassium oleate | Potassium oleate | Potassium oleate | Potassium oleate |
| Amount per 100 parts by weight of polymer (part by weight) | 1.0 | 1.0 | 1.0 | 1.0 | 1.0 |
| First vessel | | | | | |
| Kind of acid | Sulfuric acid | Sulfuric acid | Sulfuric acid | Sulfuric acid | Sulfuric acid |
| pH | 1.8 | 2.0 | 2.0 | 3.6 | 3.5 |
| Temperature (°C.) | 40 | 40 | 40 | 40 | 40 |
| Amount of aggregated polymer (%) | 65 | 72 | 57 | 58 | 50 |
| Second vessel | | | | | |
| Kind of acid | Sulfuric acid | Sulfuric acid | Sulfuric acid | Sulfuric acid | Sulfuric acid |
| pH | 1.5 | 1.5 | 1.5 | 2.2 | 2.1 |
| Temperature (°C.) | 40 | 40 | 40 | 40 | 40 |
| Third vessel | | | | | |
| Kind of alkali | NaOH | NaOH | NaOH | — | — |
| pH | 3.0 | 3.0 | 3.0 | 2.2 | 2.1 |
| Temperature (°C.) | 40 | 40 | 40 | 40 | 40 |

TABLE 4-continued

|  | Example | | | | |
| --- | --- | --- | --- | --- | --- |
|  | 15 | 16 | 17 | 18 | 19 |
| Fourth vessel |  |  |  |  |  |
| Temperature (°C.) | 60 | 60 | 60 | 60 | 60 |
| Heat-treatment time (min) | 2 | 2 | 2 | 2 | 2 |
| Particle size distribution (%) |  |  |  |  |  |
| 840 μm or more | 1.3 | 0.3 | 0.6 | 1.2 | 0.5 |
| 840–500 μm | 4.0 | 2.9 | 1.8 | 4.1 | 2.6 |
| 500–210 μm | 25.7 | 20.8 | 27.5 | 25.6 | 26.1 |
| 210–105 μm | 54.9 | 52.1 | 54.2 | 55.1 | 54.0 |
| 105–37 μm | 13.6 | 23.7 | 15.7 | 13.4 | 16.7 |
| 37 μm or less | 0.5 | 0.2 | 0.2 | 0.6 | 0.1 |
| Symmetry degree of particle | 1.8 | 1.9 | 1.9 | 1.8 | 1.9 |
| Bulk specific gravity (g/ml) | 0.44 | 0.45 | 0.43 | 0.45 | 0.44 |
| Thermal stability | ○ | ○ | ○ | ○ | ○ |

EXAMPLES 20 AND 21

The powdery and granular polymer was obtained in the same manner as in Example 19 except that the heat-treatment temperature and heat-treatment time in the fourth vessel were changed as shown in Table 5. The results are shown in Table 5.

EXAMPLE 22

The powdery and granular polymer was obtained in the same manner as in Example 15 except that the heat-treatment temperature in the fourth vessel was changed as shown in Table 5. The results are shown in Table 5.

EXAMPLE 23

The powdery and granular polymer was obtained in the same manner as in Example 15 except that neither the addition of an alkali, nor the adjustment of pH was carried out in the third vessel. The results are shown in Table 5.

Comparative Example 4

The powdery and granular polymer was obtained in the same manner as in Example 15 except that pH and the amount (%) of the aggregated polymer in the first vessel were changed as shown in Table 5, and also that the acid was not supplied to the second vessel because coagulation had been completed in the first vessel. The results are shown in Table 5.

TABLE 5

|  | Example | | | | Comparative Example |
| --- | --- | --- | --- | --- | --- |
|  | 20 | 21 | 22 | 23 | 4 |
| Sulfuric acid ester series and/or sulfonic anionic surface active agents |  |  |  |  |  |
| Kind | Sodium polyoxyethylene alkyl ether sulfate | Sodium polyoxyethylene alkyl ether sulfate | Sodium lauryl sulfate | Sodium lauryl sulfate | Sodium lauryl sulfate |
| Amount per 100 parts by weight of polymer (part by weight) | 0.1 | 0.1 | 0.2 | 0.2 | 0.2 |
| Other surface active agents |  |  |  |  |  |
| Kind | Potassium oleate | Potassium oleate | Potassium oleate | Potassium oleate | Potassium oleate |
| Amount per 100 parts by weight of polymer (part by weight) | 1.0 | 1.0 | 1.0 | 1.0 | 1.0 |
| First vessel |  |  |  |  |  |
| Kind of acid | Sulfuric acid | Sulfuric acid | Sulfuric acid | Sulfuric acid | Sulfuric acid |

TABLE 5-continued

|  | Example | | | | Comparative Example |
|---|---|---|---|---|---|
|  | 20 | 21 | 22 | 23 | 4 |
| pH | 3.5 | 3.5 | 1.8 | 1.8 | 1.4 |
| Temperature (°C.) | 40 | 40 | 40 | 40 | 40 |
| Amount of aggregated polymer (%) | 50 | 50 | 65 | 65 | 100 |
| Second vessel | | | | | |
| Kind of acid | Sulfuric acid | Sulfuric acid | Sulfuric acid | Sulfuric acid | Sulfuric acid |
| pH | 2.1 | 2.1 | 1.5 | 1.5 | 1.4 |
| Temperature (°C.) | 40 | 40 | 40 | 40 | 40 |
| Third vessel | | | | | |
| Kind of alkali | — | — | NaOH | — | NaOH |
| pH | 2.1 | 2.1 | 3.0 | 1.5 | 3.0 |
| Temperature (°C.) | 40 | 40 | 40 | 40 | 40 |
| Fourth vessel | | | | | |
| Temperature (°C.) | 55 | 70 | 85 | 60 | 60 |
| Heat-treatment time (min) | 5 | 2 | 2 | 2 | 2 |
| Particle size distribution (%) | | | | | |
| 840 μm or more | 0.5 | 0.5 | 1.3 | 1.3 | 1.8 |
| 840–500 μm | 2.6 | 2.6 | 4.0 | 4.0 | 12.3 |
| 500–210 μm | 26.1 | 26.1 | 25.7 | 25.7 | 30.3 |
| 210–105 μm | 54.0 | 54.0 | 54.9 | 54.9 | 27.0 |
| 105–37 μm | 16.7 | 16.7 | 13.6 | 13.6 | 27.6 |
| 37 μm or less | 0.1 | 0.1 | 0.5 | 0.5 | 1.0 |
| Symmetry degree of particle | 1.9 | 1.9 | 1.8 | 1.8 | 3.3 |
| Bulk specific gravity (g/ml) | 0.47 | 0.41 | 0.33 | 0.44 | 0.30 |
| Thermal stability | o | o | o | x | o |

EXAMPLE 24

The powdery and granular polymer was obtained in the same manner as in Example 18 except that the heat-treatment temperature in the fourth vessel was changed as shown in Table 6. The results are shown in Table 6.

EXAMPLES 25 AND 26

The powdery and granular polymer was obtained in the same manner as in Example 24 except that the kind of the surface active agent present in the latex, pH and the amount of the coagulated polymer in the first vessel and pH in the second vessel were changed as shown in Table 6. The results are shown in Table 6.

EXAMPLE 27

The powdery and granular polymer was obtained in the same manner as in Example 24 except that the kind of the surface active agent present in the latex and pH and the amount of the coagulated polymer in the first vessel were changed as shown in Table 6. The results are shown in Table 6.

EXAMPLE 28

The powdery and granular polymer was obtained in the same manner as in Example 24 except that the amount of the surface active agent present in the latex, pH and the amount of the aggregated polymer in the first vessel and pH in the second vessel were changed as shown in Table 6. The results are shown in Table 6.

EXAMPLE 29

The powdery and granular polymer was obtained in the same manner as in Example 24 except that the kind and amount of the surface active agent present in the latex, pH and the amount of the aggregated polymer in the first vessel and pH in the second vessel were changed as shown in Table 6. The results are shown in Table 6.

TABLE 6

| | Example | | | | | |
|---|---|---|---|---|---|---|
| | 24 | 25 | 26 | 27 | 28 | 29 |
| Sulfuric acid ester series and/or sulfonic acid series anionic surface active agents | | | | | | |
| Kind | Sodium lauryl sulfate | Sodium dioctyl-sulfo-succinate | Sodium dodecyl-benzene-sulfonate | Sodium polyoxy-ethylene alkyl ether sulfate | Sodium lauryl sulfate | Sodium polyoxy-ethylene alkyl ether sulfate |
| Amount per 100 parts by weight of polymer (part by weight) | 0.08 | 0.08 | 0.08 | 0.08 | 0.05 | 0.1 |
| Other surface active agents | | | | | | |
| Kind | Potassium oleate | Potassium oleate | Potassium oleate | Potassium oleate | Potassium oleate | Potassium oleate |
| Amount per 100 parts by weight of polymer (part by weight) | 1.0 | 1.0 | 1.0 | 1.0 | 1.0 | 1.0 |
| First vessel | | | | | | |
| Kind of acid | Sulfuric acid | Sulfuric acid | Sulfuric acid | Sulfuric acid | Sulfuric acid | Sulfuric acid |
| pH | 3.6 | 3.7 | 3.7 | 3.7 | 4.6 | 3.5 |
| Temperature (°C.) | 40 | 40 | 40 | 40 | 40 | 40 |
| Amount of aggregated polymer (%) | 58 | 66 | 64 | 62 | 64 | 50 |
| Second vessel | | | | | | |
| Kind of acid | Sulfuric acid | Sulfuric acid | Sulfuric acid | Sulfuric acid | Sulfuric acid | Sulfuric acid |
| pH | 2.2 | 2.3 | 2.2 | 2.2 | 2.8 | 2.1 |
| Temperature (°C.) | 40 | 40 | 40 | 40 | 40 | 40 |
| Third vessel | | | | | | |
| Kind of alkali | — | — | — | — | — | — |
| pH | 2.2 | 2.3 | 2.1 | 2.2 | 2.8 | 2.1 |
| Temperature (°C.) | 40 | 40 | 40 | 40 | 40 | 40 |
| Fourth vessel | | | | | | |
| Temperature (°C.) | 85 | 85 | 85 | 85 | 85 | 85 |
| Heat-treatment time (min) | 2 | 2 | 2 | 2 | 2 | 2 |
| Particle size distribution (%) | | | | | | |
| 840 µm or more | 1.2 | 0.3 | 0.4 | 0.2 | 0 | 0.5 |
| 840–500 µm | 4.1 | 3.0 | 2.0 | 2.7 | 2.2 | 2.6 |
| 500–210 µm | 25.6 | 20.7 | 27.1 | 27.8 | 20.0 | 26.1 |
| 210–105 µm | 55.1 | 52.4 | 54.4 | 58.3 | 63.6 | 54.0 |
| 105–37 µm | 13.4 | 23.5 | 15.9 | 10.3 | 13.5 | 16.7 |
| 37 µm or less | 0.6 | 0.2 | 0.2 | 0.7 | 0.7 | 0.1 |
| Symmetry degree of particle | 1.8 | 1.9 | 1.9 | 1.7 | 1.6 | 1.9 |
| Bulk specific gravity (g/ml) | 0.33 | 0.32 | 0.33 | 0.32 | 0.33 | 0.33 |
| Thermal stability | ○ | ○ | ○ | ○ | ○ | ○ |

EXAMPLES 30 AND 31

The powdery and granular polymer was obtained in the same manner as in Example 24 except that pH in the second vessel was changed as shown in Table 7. The results are shown in Table 7.

EXAMPLE 32

The powdery and granular polymer was obtained in the same manner as in Example 24 except that the amount of the surface active agent present in the latex, pH and the amount of the aggregated polymer in the first vessel and pH in the second vessel were changed as shown in Table 7. The results are shown in Table 7.

Comparative Example 5

The powdery and granular polymer was obtained in the same manner as in Example 24 except that pH in the first vessel was changed as shown in Table 7, and the acid was not supplied to the second vessel because coagulation had been completed in the first vessel. The results are shown in Table 7.

Comparative Example 6

The powdery and granular polymer was obtained in the same manner as in Example 24 except that pH and the amount of the aggregated polymer in the first vessel were changed as shown in Table 7. The results are shown in Table 7.

Comparative Example 7

The powdery and granular polymer was obtained in the same manner as in Example 24 except that the amount of the surface active agent present in the latex, pH and the amount of the aggregated polymer in the first vessel and pH in the second vessel were changed as shown in Table 7. The results are shown in Table 7.

TABLE 7

|  | Example | | | Comparative Example | | |
| --- | --- | --- | --- | --- | --- | --- |
|  | 30 | 31 | 32 | 5 | 6 | 7 |
| Sulfuric acid ester series and/or sulfonic acid series anionic surface active agents | | | | | | |
| Kind | Sodium lauryl sulfate | Sodium lauryl sulfate | Sodium lauryl sulfate | Sodium lauryl sulfate | Sodium lauryl sulfate | Sodium lauryl sulfate |
| Amount per 100 parts by weight of polymer (part by weight) | 0.08 | 0.08 | 0.3 | 0.08 | 0.08 | 0 |
| Other surface active agents | | | | | | |
| Kind | Potassium oleate | Potassium oleate | Potassium oleate | Potassium oleate | Potassium oleate | Potassium oleate |
| Amount per 100 parts by weight of polymer (part by weight) | 1.0 | 1.0 | 1.0 | 1.0 | 1.0 | 1.0 |
| First vessel | | | | | | |
| Kind of acid | Sulfuric acid | Sulfuric acid | Sulfuric acid | Sulfuric acid | Sulfuric acid | Sulfuric acid |
| pH | 3.6 | 3.6 | 1.8 | 1.4 | 4.2 | 4.0 |
| Temperature (°C.) | 40 | 40 | 40 | 40 | 40 | 40 |
| Amount of aggregated polymer (%) | 58 | 58 | 74 | 100 | 12 | 68 |
| Second vessel | | | | | | |
| Kind of acid | Sulfuric acid | Sulfuric acid | Sulfuric acid | — | Sulfuric acid | Sulfuric acid |
| pH | 1.8 | 1.5 | 1.6 | 1.4 | 2.2 | 2.4 |
| Temperature (°C.) | 40 | 40 | 40 | 40 | 40 | 40 |
| Third vessel | | | | | | |
| Kind of alkali | — | — | — | — | — | — |
| pH | 1.8 | 1.5 | 1.6 | 1.4 | 2.2 | 2.4 |
| Temperature (°C.) | 40 | 40 | 40 | 40 | 40 | 40 |
| Fourth vessel | | | | | | |
| Temperature (°C.) | 85 | 85 | 85 | 85 | 85 | 85 |
| Heat-treatment time (min) | 2 | 2 | 2 | 2 | 2 | 2 |
| Particle size distribution (%) | | | | | | |
| 840 μm or more | 1.2 | 1.8 | 11.2 | 14.2 | | |
| 840–500 μm | 4.1 | 4.1 | 4.0 | 12.3 | 6.7 | 14.0 |
| 500–210 μm | 25.6 | 25.6 | 25.7 | 30.3 | 26.3 | 30.4 |
| 210–105 μm | 55.1 | 55.1 | 54.9 | 27.0 | 39.8 | 24.2 |
| 105–37 μm | 13.4 | 13.4 | 13.6 | 27.6 | 15.4 | 16.2 |
| 37 μm or less | 0.6 | 0.6 | 0.5 | 1.0 | 0.6 | 1.0 |
| Symmetry degree of particle | 1.8 | 1.8 | 1.8 | 3.3 | 2.9 | 4.2 |
| Bulk specific gravity (g/ml) | 0.33 | 0.32 | 0.33 | 0.32 | 0.33 | 0.33 |

TABLE 7-continued

|  | Example | | | Comparative Example | | |
| --- | --- | --- | --- | --- | --- | --- |
|  | 30 | 31 | 32 | 5 | 6 | 7 |
| Thermal stability | Δ | x | x | x | o | o |

EXAMPLE 33

A latex of a graft copolymer (solid content, 36 wt. %) was obtained by graft-polymerizing 12.5 parts by weight of styrene, 11 parts by weight of methyl methacrylate and 1.5 parts by weight of ethyl acrylate onto 75 parts by weight of a styrene/butadiene elastic backbone polymer. The polymer particle in the resulting latex (pH 8.0) had an average particle size of 0.1 μm. The kind and amount of the surface active agent present in the latex are as shown in Table 8.

The above latex and the acid shown in Table 8 were supplied to the first vessel so that pH and the amount (%) of the aggregated polymer in the vessel took values shown in Table 8. The acid shown in Table 8 was supplied to the second vessel so that pH in the vessel took a value shown in Table 8. The alkali shown in Table 8 was supplied to the third vessel so that pH in the vessel took a value shown in Table 8. Further, a hard non-elastic polymer latex (solid content, 25 wt. %; average particle size, 0.1 μm), produced by emulsion-polymerizing 85 parts by weight of methyl methacrylate with 15 parts by weight of butyl acrylate, was added to the third vessel in an amount of 2 parts by weight (converted to a solid content) based on 100 parts by weight of the above graft copolymer. The temperature in each vessel was controlled so as to take a value shown in Table 8. The slurry discharged from the fourth vessel was washed with water, dehydrated and dried to obtain the powdery and granular polymer. The results are shown in Table 8.

EXAMPLE 34

The powdery and granular polymer was obtained in the same manner as in Example 33 except that the kind and amount of the surface active agent present in the latex, pH and the amount (%) of the aggregated polymer in the first vessel and pH in the second vessel were changed as shown in Table 8, and also that pH in the third vessel was changed as shown in Table 8 without adding an alkali to the third vessel. The results are shown in Table 8.

EXAMPLE 35

The powdery and granular polymer was obtained in the same manner as in Example 34 except that the heat-treatment temperature and heat-treatment time in the fourth vessel were changed as shown in Table 8. The results are shown in Table 8.

TABLE 8

|  | Example | | |
| --- | --- | --- | --- |
|  | 33 | 34 | 35 |
| Sulfuric acid ester series and/or sulfonic acid series anionic surface active agents | | | |
| Kind | Sodium lauryl sulfate | Sodium polyoxyethylene alkyl ether sulfate | Sodium polyoxyethylene alkyl ether sulfate |
| Amount per 100 parts by weight of polymer (part by weight) | 0.2 | 0.1 | 0.1 |
| Other surface active agents | | | |
| Kind | Potassium oleate | Potassium oleate | Potassium oleate |
| Amount per 100 parts by weight of polymer (part by weight) | 1.0 | 1.0 | 1.0 |
| First vessel | | | |
| Kind of acid | Sulfuric acid | Sulfuric acid | Sulfuric acid |
| pH | 1.8 | 3.5 | 3.5 |
| Temperature (°C.) | 20 | 20 | 20 |
| Amount of aggregated polymer (%) | 66 | 52 | 52 |
| Second vessel | | | |
| Kind of acid | Sulfuric acid | Sulfuric acid | Sulfuric acid |
| pH | 1.5 | 2.1 | 2.1 |
| Temperature (°C.) | 20 | 20 | 20 |
| Third vessel | | | |

TABLE 8-continued

|  | Example | | |
|---|---|---|---|
|  | 33 | 34 | 35 |
| Kind of alkali | NaOH | — | — |
| pH | 3.0 | 2.1 | 2.1 |
| Temperature (°C.) | 20 | 20 | 20 |
| Fourth vessel | | | |
| Temperature (°C.) | 60 | 60 | 95 |
| Heat-treatment time (min) | 2 | 2 | 0.5 |
| Particle size distribution (%) | | | |
| 840 μm or more | 0.8 | 0.4 | 0.4 |
| 840–500 μm | 2.0 | 2.7 | 2.7 |
| 500–210 μm | 27.7 | 26.0 | 26.0 |
| 210–105 μm | 54.0 | 54.1 | 54.1 |
| 105–37 μm | 15.8 | 16.5 | 16.5 |
| 37 μm or less | 0.1 | 0.3 | 0.3 |
| Symmetry degree of particle | 1.9 | 1.9 | 1.9 |
| Bulk specific gravity (g/ml) | 0.46 | 0.45 | 0.32 |
| Thermal stability | ○ | ○ | ○ |

What is claimed is:

1. A method for producing a powdery and granular polymer by two coagulation steps, comprising:
   (a) coagulating a latex of a polymer, the polymer having a glass transition temperature of 25° C. or more and the latex containing a sulfuric acid ester—or sulfonic acid—anionic surface active agent or both, with an acid to an amount of the polymer of 40–80 wt. % for a time sufficient therefor, in a first coagulation step;
   (b) bringing the coagulation to completion with an acid or salt in a second coagulation step to obtain a slurry; and
   (c) heat-treating the slurry for 30 minutes or more in the range of 90° C. to 120° C.; and
   wherein in the second coagulation of the latex of the polymer, the latex contains the sulfuric acid ester—or sulfonic acid—anionic surface active agent or both in an amount of 0.05 to 0.15 parts by weight in total based on 100 parts by weight of the polymer, said second coagulation being brought to completion with the acid pH of the slurry to 2.0 or more; and
   wherein after completion of said coagulation, a hard, non-elastic polymer or inorganic compound for powder modification is added in an amount of 0.01 to 10 parts by weight based on 100 parts by weight of the copolymer.

2. A method for producing a powdery and granular polymer by two coagulation steps, comprising:
   (a) coagulating a latex of a graft copolymer, the latex containing a sulfuric acid ester—or sulfonic acid—anionic surface active agent or both, with an acid to an amount of the polymer of 40–80 wt. % for a time sufficient therefor, in a first coagulation step;
   (b) bringing the coagulation to completion with an acid or salt in a second coagulation step to obtain a slurry, and
   (c) heat-treating the slurry at 75° C. or less to dry said slurry, the above graft copolymer containing 60 wt. % or more of an elastic backbone polymer and being obtained by emulsion-polymerizing a monomer capable of forming hard polymers onto the elastic backbone polymer; and
   wherein in said second coagulation of the latex of the graft polymer, the latex contains a sulfuric acid ester—or sulfonic acid—anionic surface active agent or both in an amount of about 0.05 to 0.15 parts by weight in total based on 100 parts by weight of the graft copolymer, said second coagulation being brought to completion with the acid at a pH of the slurry of 2.0 or more; and
   wherein after the completion of coagulation, a hard, non-elastic polymer or inorganic compound for powder modification is added in an amount of 0.01 to 10 parts by weight based on 100 parts by weight of the graft copolymer.

3. The method according to claim 1, wherein the polymer is one obtained from a monomer or monomer mixture containing at least 60 wt. % of one or more members selected from the group consisting of methyl methacrylate, butyl methacrylate, styrene and α-methylstyrene.

4. The method according to claim 1, wherein the second coagulation is brought to completion at a pH of the slurry of 2.0 or more with the acid.

5. The method according to claim 1, wherein in the first coagulation of the latex of the polymer, the latex contains the sulfuric acid ester- or sulfonic acid- anionic surface active agent or both in an amount of 0.05 to 0.15 part by weight in total based on 100 parts by weight of the polymer, and said first coagulation is carried out with the acid in a pH range represented by the following equation:

$$pH \leq \frac{0.2}{X} + 2.0$$

wherein X represents parts by weight of the sulfuric acid ester- or sulfonic acid- anionic surface active agent or both based on 100 parts by weight of the polymer.

6. The method according to claim 2, wherein the second coagulation is brought to completion at a pH of the slurry of 2.0 or more with the acid.

7. The method according to claim 2, wherein in the first coagulation of the latex of the graft copolymer, the latex contains the sulfuric acid ester- or sulfonic acid- anionic surface active agent or both in an amount of 0.05 to 0.15 part by weight in total based on 100 parts by weight of the graft copolymer, and said first coagulation is carried out with the acid in a pH range represented by the following equation:

$$pH \leq \frac{0.2}{X} + 2.0$$

wherein X represents parts by weight of the sulfuric acid ester- or sulfonic acid- anionic surface active agent or both based on 100 parts by weight of the graft copolymer.

8. The method according to claim 1 or 2, wherein said sulfuric acid ester-anionic surface active agent comprises a salt of a higher alcohol sulfuric acid ester or a salt of a polyoxyethylene alkyl sulfuric acid ester.

9. The method according to claim 1 or 2, wherein said sulfuric acid ester anionic surface active agent comprises sodium polyoxyethylene alkyl ether sulfate or sodium lauryl sulfate.

10. The method according to claim 1 or 2, wherein said sulfonic acid ester-anionic surface active agent comprises sodium dodecylbenzene sulfonate.

* * * * *